(12) United States Patent
Hedtke

(10) Patent No.: US 9,921,120 B2
(45) Date of Patent: *Mar. 20, 2018

(54) INDUSTRIAL PROCESS DEVICE UTILIZING PIEZOELECTRIC TRANSDUCER

(75) Inventor: Robert C. Hedtke, Young America, MN (US)

(73) Assignee: Rosemount Inc., Eden Prairie, MN (US)

( * ) Notice: Subject to any disclaimer, the term of this patent is extended or adjusted under 35 U.S.C. 154(b) by 616 days.

This patent is subject to a terminal disclaimer.

(21) Appl. No.: 13/562,772

(22) Filed: Jul. 31, 2012

(65) Prior Publication Data
US 2013/0079895 A1   Mar. 28, 2013

Related U.S. Application Data

(62) Division of application No. 12/107,225, filed on Apr. 22, 2008, now Pat. No. 8,250,924.

(51) Int. Cl.
| | | |
|---|---|---|
| G01H 11/08 | (2006.01) | |
| G01L 9/00 | (2006.01) | |
| G05B 11/01 | (2006.01) | |
| G01F 1/20 | (2006.01) | |
| G01F 1/32 | (2006.01) | |

(52) U.S. Cl.
CPC .............. G01L 9/00 (2013.01); G01H 11/08 (2013.01); G01L 9/0008 (2013.01); G01L 9/0022 (2013.01); G05B 11/01 (2013.01)

(58) Field of Classification Search
CPC ....... G01L 9/00; G01L 9/0008; G01L 9/0022; G05B 11/01; G01H 11/08

USPC ......... 73/660, 861.18–861.24; 310/338, 339, 310/329, 327
See application file for complete search history.

(56) References Cited

U.S. PATENT DOCUMENTS

| 424,027 A | 3/1890 | Roberts | |
|---|---|---|---|
| 2,883,489 A | 4/1959 | Eadie, Jr. et al. | ............ 355/148 |
| 3,232,712 A | 2/1966 | Stearns | ........................... 23/255 |

(Continued)

FOREIGN PATENT DOCUMENTS

| CH | 672360 A5 | 11/1989 |
|---|---|---|
| CN | 1251953 A | 5/2000 |

(Continued)

OTHER PUBLICATIONS

Third Chinese Office Action for Chinese Patent Application No. 200980114167.8, dated Jun. 5, 2013, 9 pages.

(Continued)

*Primary Examiner* — Manish S Shah
*Assistant Examiner* — Rose M Miller
(74) *Attorney, Agent, or Firm* — Westman, Champlin & Koehler, P.A.

(57) ABSTRACT

A process device for coupling to an industrial process for use in monitoring or controlling the process includes a device housing configured to physically couple to the industrial process. A process variable sensor is configured to measure a process variable and measurement circuitry coupled to the process variable sensor provides an output related to the sensed process variable. A piezoelectric transducer provides an electrical output related to pressure pulsations in the industrial process. Electrical circuitry in the housing includes an input configured to receive the electrical output from the piezoelectric sensor.

32 Claims, 8 Drawing Sheets

(56) References Cited

U.S. PATENT DOCUMENTS

| | | | |
|---|---|---|---|
| 3,612,851 A | 10/1971 | Fowler | 362/30 |
| 3,633,053 A | 1/1972 | Peters | 310/15 |
| D225,743 S | 1/1973 | Seltzer | D10/102 |
| 3,854,323 A | 12/1974 | Hearn et al. | |
| 3,885,432 A | 5/1975 | Herzl | 73/861.22 |
| 3,964,296 A | 6/1976 | Matzuk | 73/67.5 |
| 4,005,319 A | 1/1977 | Nilsson et al. | 310/8.3 |
| 4,083,031 A | 4/1978 | Pharo, Jr. | 367/135 |
| 4,084,155 A | 4/1978 | Herzl | 340/870.39 |
| 4,116,060 A | 9/1978 | Frederick | 73/861.22 |
| 4,237,454 A | 12/1980 | Meyer | 340/682 |
| 4,255,964 A | 3/1981 | Morison | 73/24.01 |
| 4,292,769 A | 10/1981 | Maag et al. | 451/9 |
| 4,355,536 A | 10/1982 | McShane et al. | 73/633 |
| 4,361,045 A | 11/1982 | Iwasaki | |
| 4,370,890 A | 2/1983 | Frick | 73/18 |
| 4,383,443 A | 5/1983 | Langdon | 73/290 |
| 4,383,801 A | 5/1983 | Pryor | 416/17 |
| 4,389,895 A | 6/1983 | Rud, Jr. | 73/724 |
| 4,390,321 A | 6/1983 | Langlois et al. | 417/15 |
| 4,393,711 A | 7/1983 | Lapides | 73/592 |
| 4,423,634 A | 1/1984 | Audenard et al. | 73/587 |
| 4,446,741 A | 5/1984 | Sirokorad et al. | 73/654 |
| 4,448,062 A | 5/1984 | Peterson et al. | 73/86 |
| 4,475,047 A | 10/1984 | Ebert, Jr. | 307/66 |
| 4,476,853 A | 10/1984 | Arbogast | 126/578 |
| 4,536,753 A | 8/1985 | Parker | 340/566 |
| 4,590,466 A | 5/1986 | Wiklund et al. | 340/870.28 |
| 4,641,529 A | 2/1987 | Lorenzi et al. | 73/601 |
| 4,696,191 A | 9/1987 | Claytor et al. | 73/600 |
| 4,704,607 A | 11/1987 | Teather et al. | 340/825.07 |
| 4,749,993 A | 6/1988 | Szabo et al. | 340/870.31 |
| 4,860,232 A | 8/1989 | Lee et al. | 364/571.04 |
| 4,878,012 A | 10/1989 | Schulte et al. | 324/60 |
| 4,895,031 A | 1/1990 | Cage | 73/861.355 |
| 4,977,480 A | 12/1990 | Nishihara | 73/724 |
| 4,979,125 A | 12/1990 | Kwun et al. | 702/35 |
| 4,982,412 A | 1/1991 | Gross | 377/6 |
| 5,014,543 A | 5/1991 | Franklin et al. | 73/40.5 |
| 5,015,949 A | 5/1991 | Koch et al. | 325/207.25 |
| 5,025,202 A | 6/1991 | Ishii et al. | 320/101 |
| 5,047,990 A | 9/1991 | Gafos et al. | 367/6 |
| 5,094,109 A | 3/1992 | Dean et al. | 73/718 |
| D331,370 S | 12/1992 | Williams | D10/46 |
| 5,107,671 A | 12/1992 | Miau | 73/861.22 |
| 5,223,763 A | 6/1993 | Chang | 310/339 |
| D345,107 S | 3/1994 | Williams | D10/46 |
| 5,313,831 A | 5/1994 | Beckman | 73/204.24 |
| 5,329,818 A | 7/1994 | Frick et al. | 73/708 |
| 5,369,674 A | 11/1994 | Yokose et al. | 376/245 |
| 5,372,041 A | 12/1994 | Yoshida et al. | 75/514.31 |
| 5,495,769 A | 3/1996 | Broden et al. | 73/18 |
| 5,497,661 A | 3/1996 | Stripf et al. | 73/611 |
| 5,506,757 A | 4/1996 | Brorby | 361/796 |
| 5,554,809 A | 9/1996 | Tobita et al. | 73/700 |
| 5,554,922 A | 9/1996 | Kunkel | 322/3 |
| 5,606,513 A | 2/1997 | Louwagie et al. | 702/138 |
| 5,637,802 A | 6/1997 | Frick et al. | 73/724 |
| 5,642,301 A | 6/1997 | Warrior et al. | 364/571.02 |
| 5,650,943 A | 7/1997 | Powell et al. | 364/550 |
| 5,656,782 A | 8/1997 | Powell, II et al. | 73/756 |
| 5,665,899 A | 9/1997 | Willcox | 731/1.63 |
| 5,682,476 A | 10/1997 | Tapperson et al. | 370/225 |
| 5,705,978 A | 1/1998 | Frick et al. | 340/511 |
| 5,756,898 A | 5/1998 | Diatschenko et al. | 73/592 |
| 5,793,963 A | 8/1998 | Tapperson et al. | 395/200.31 |
| 5,796,006 A | 8/1998 | Bellet et al. | 73/658 |
| 5,803,604 A | 9/1998 | Pompei | 374/181 |
| 5,811,201 A | 9/1998 | Skowronski | 429/17 |
| 5,851,083 A | 12/1998 | Palan | 403/337 |
| 5,854,993 A | 12/1998 | Grichnik | 702/54 |
| 5,870,695 A | 2/1999 | Brown et al. | 702/138 |
| 5,872,494 A | 2/1999 | Palan et al. | 333/252 |
| 5,874,676 A | 2/1999 | Maki, Jr. | 73/579 |
| 5,899,962 A | 5/1999 | Louwagie et al. | 702/138 |
| 5,929,372 A | 7/1999 | Oudoire et al. | 136/208 |
| 5,954,526 A | 9/1999 | Smith | 439/136 |
| 5,956,663 A | 9/1999 | Eryurek | 702/183 |
| 5,978,658 A | 11/1999 | Shoji | 455/66 |
| 6,017,143 A | 1/2000 | Eryurek et al. | 706/23 |
| 6,069,560 A | 5/2000 | Larsson | 340/540 |
| 6,076,405 A * | 6/2000 | Schoess | 73/587 |
| 6,079,276 A | 6/2000 | Frick et al. | 73/18 |
| 6,119,047 A | 9/2000 | Eryurek et al. | 700/28 |
| 6,127,739 A | 10/2000 | Appa | 290/55 |
| 6,199,018 B1 | 3/2001 | Quist et al. | 702/34 |
| 6,259,372 B1 * | 7/2001 | Taranowski et al. | 340/683 |
| 6,282,247 B1 | 8/2001 | Shen | 375/285 |
| 6,289,735 B1 | 9/2001 | Dister et al. | 73/579 |
| 6,295,875 B1 | 10/2001 | Frick et al. | 73/718 |
| 6,326,764 B1 | 12/2001 | Virtudes | 320/101 |
| 6,332,112 B1 | 12/2001 | Shukunami et al. | 702/56 |
| 6,338,283 B1 | 1/2002 | Blazquez Navarro | 73/865.8 |
| 6,360,277 B1 | 3/2002 | Ruckley et al. | 709/250 |
| 6,367,328 B1 | 4/2002 | Gorman et al. | 73/592 |
| 6,378,364 B1 | 4/2002 | Pelletier et al. | 73/152.47 |
| 6,385,972 B1 | 5/2002 | Fellows | 60/517 |
| 6,405,139 B1 | 6/2002 | Kicinski et al. | 702/33 |
| 6,441,747 B1 | 8/2002 | Khair et al. | 340/870.16 |
| 6,449,574 B1 | 9/2002 | Eryurk et al. | 702/99 |
| 6,480,699 B1 | 11/2002 | Lovoi | 455/41.2 |
| 6,493,689 B2 | 12/2002 | Kotoulas et al. | 706/23 |
| 6,497,222 B2 | 12/2002 | Bolz et al. | 123/476 |
| 6,508,131 B2 | 1/2003 | Frick | 73/756 |
| 6,530,259 B1 | 3/2003 | Kelly et al. | 73/23.2 |
| 6,567,006 B1 | 5/2003 | Lander et al. | 340/605 |
| 6,574,515 B1 | 6/2003 | Kirkpatrick et al. | 700/19 |
| 6,584,847 B1 | 7/2003 | Hirose | 73/579 |
| 6,597,997 B2 | 7/2003 | Tingley | 702/34 |
| 6,601,005 B1 | 7/2003 | Eryurek et al. | 702/104 |
| 6,637,267 B2 | 10/2003 | Fiebelkorn et al. | 73/587 |
| 6,661,220 B1 | 12/2003 | Glehr | 324/207.17 |
| 6,711,446 B2 | 3/2004 | Kirkpatrick et al. | 700/19 |
| 6,722,185 B2 | 4/2004 | Lawson et al. | 73/40 |
| 6,727,812 B2 | 4/2004 | Sauler et al. | 340/511 |
| 6,747,573 B1 | 6/2004 | Gerlach et al. | 640/870.21 |
| 6,751,560 B1 | 6/2004 | Tingley et al. | 702/51 |
| 6,774,814 B2 | 8/2004 | Hilleary | 340/870.07 |
| 6,778,100 B2 | 8/2004 | Schempf | 340/870.07 |
| 6,792,259 B1 | 9/2004 | Parise | 455/343.1 |
| 6,839,546 B2 | 1/2005 | Hedtke | 455/67.11 |
| 6,843,110 B2 | 1/2005 | Deane et al. | 73/114.35 |
| 6,880,403 B1 | 4/2005 | Shimada et al. | 73/652 |
| 6,891,838 B1 | 5/2005 | Petite et al. | 370/401 |
| 6,904,295 B2 | 6/2005 | Yang | 455/522 |
| 6,907,383 B2 | 6/2005 | Eryurek et al. | 702/183 |
| 6,910,332 B2 | 6/2005 | Fellows | 60/520 |
| 6,920,789 B2 | 7/2005 | Sakai | 73/587 |
| 6,951,133 B2 | 10/2005 | Passarelli | 73/643 |
| 6,976,503 B2 | 12/2005 | Ens et al. | 137/552 |
| 6,984,899 B1 | 1/2006 | Rice | 290/44 |
| 7,010,294 B1 | 3/2006 | Pyotsia et al. | 455/420 |
| 7,010,459 B2 | 3/2006 | Eryurek et al. | 702/182 |
| 7,023,205 B1 | 4/2006 | Krupp | 324/239 |
| 7,035,773 B2 | 4/2006 | Keyes et al. | 702/188 |
| 7,036,983 B2 | 5/2006 | Green et al. | 374/179 |
| 7,040,179 B2 | 5/2006 | Drahm et al. | 73/561.356 |
| 7,058,542 B2 | 6/2006 | Hauhia et al. | 702/183 |
| 7,073,394 B2 | 7/2006 | Foster | 73/861.22 |
| 7,104,116 B2 | 9/2006 | Discenzo | 73/54.28 |
| 7,114,516 B2 | 10/2006 | Ito | 137/487.5 |
| 7,116,036 B2 | 10/2006 | Balasubramaniam et al. | 310/322 |
| 7,137,307 B2 | 11/2006 | Huybrechts et al. | 73/861.12 |
| 7,173,343 B2 | 2/2007 | Kugel | 290/1 R |
| 7,197,953 B2 | 4/2007 | Olin | 73/866.5 |
| 7,233,745 B2 | 6/2007 | Loechner | 398/128 |
| 7,254,518 B2 | 8/2007 | Eryurek et al. | 702/183 |
| 7,258,024 B2 | 8/2007 | Dimarco et al. | 73/861.22 |
| 7,262,693 B2 | 8/2007 | Karschnia et al. | 340/508 |
| 7,271,679 B2 | 9/2007 | Lundberg et al. | 333/24 |
| 7,290,450 B2 | 11/2007 | Brown et al. | 73/579 |
| 7,301,454 B2 | 11/2007 | Seyfang et al. | 340/539.26 |
| 7,321,846 B1 | 1/2008 | Huisenga et al. | 702/183 |

(56) References Cited

U.S. PATENT DOCUMENTS

| | | | |
|---|---|---|---|
| 7,329,959 B2 | 2/2008 | Kim et al. ............ 290/2 | |
| 7,579,947 B2 | 8/2009 | Peluso | |
| 7,597,947 B2 | 8/2009 | Peluso ............ 340/539.26 | |
| 7,581,434 B1 | 9/2009 | Discenzo et al. ........... 73/53.01 | |
| 7,627,441 B2* | 12/2009 | Longsdorf et al. ............ 702/56 | |
| 7,680,460 B2 | 3/2010 | Nelson et al. ............ 455/67.11 | |
| 7,747,415 B1* | 6/2010 | Churchill et al. ............ 702/187 | |
| 7,977,924 B2 | 7/2011 | Hedtke et al. ............ 322/3 | |
| 8,538,560 B2* | 9/2013 | Brown et al. ............ 700/22 | |
| 2001/0025349 A1 | 9/2001 | Sharood et al. ............ 713/340 | |
| 2002/0029130 A1 | 3/2002 | Eryurek et al. ............ 702/183 | |
| 2002/0029808 A1 | 3/2002 | Friend et al. | |
| 2002/0065631 A1 | 5/2002 | Loechner ............ 702/188 | |
| 2002/0078752 A1 | 6/2002 | Braunling et al. ............ 73/627 | |
| 2002/0095520 A1 | 7/2002 | Wettstein et al. ............ 709/253 | |
| 2002/0097031 A1 | 7/2002 | Cook et al. ............ 323/273 | |
| 2002/0105968 A1 | 8/2002 | Pruzan et al. ............ 370/465 | |
| 2002/0148236 A1 | 10/2002 | Bell ............ 62/3.3 | |
| 2002/0163323 A1 | 11/2002 | Kasai et al. ............ 323/284 | |
| 2003/0030537 A1 | 2/2003 | Kogure ............ 340/3.5 | |
| 2003/0032993 A1 | 2/2003 | Mickle et al. ............ 607/60 | |
| 2003/0042740 A1 | 3/2003 | Holder et al. ............ 290/1 A | |
| 2003/0079553 A1 | 5/2003 | Cain et al. ............ 73/861.27 | |
| 2003/0097521 A1 | 5/2003 | Pfandler et al. ............ 711/103 | |
| 2003/0143958 A1 | 7/2003 | Elias et al. ............ 455/73 | |
| 2003/0171827 A1 | 9/2003 | Keyes et al. ............ 700/19 | |
| 2003/0199778 A1 | 10/2003 | Mickle et al. ............ 600/509 | |
| 2003/0204371 A1 | 10/2003 | Sciamanna ............ 702/183 | |
| 2004/0007059 A1 | 1/2004 | Tudor | |
| 2004/0025593 A1 | 2/2004 | Hashimoto et al. ............ 73/643 | |
| 2004/0086021 A1 | 5/2004 | Litwin ............ 374/120 | |
| 2004/0093174 A1 | 5/2004 | Lander ............ 702/56 | |
| 2004/0142733 A1 | 7/2004 | Parise ............ 455/572 | |
| 2004/0159235 A1 | 8/2004 | Marganski et al. ............ 95/116 | |
| 2004/0199681 A1 | 10/2004 | Hedtke ............ 710/37 | |
| 2004/0203434 A1 | 10/2004 | Karschnia et al. ............ 455/67.11 | |
| 2004/0211456 A1 | 10/2004 | Brown et al. ............ 136/243 | |
| 2004/0214543 A1 | 10/2004 | Osone et al. ............ 455/197.2 | |
| 2004/0242169 A1 | 12/2004 | Albsmeier et al. ............ 455/91 | |
| 2004/0259533 A1 | 12/2004 | Nixon et al. ............ 455/414.1 | |
| 2005/0011278 A1 | 1/2005 | Brown et al. ............ 73/861.18 | |
| 2005/0017602 A1 | 1/2005 | Arms et al. ............ 310/339 | |
| 2005/0023858 A1 | 2/2005 | Bingle et al. ............ 296/76 | |
| 2005/0029236 A1 | 2/2005 | Gambino et al. ............ 219/121.69 | |
| 2005/0046595 A1 | 3/2005 | Blyth ............ 340/908 | |
| 2005/0072239 A1 | 4/2005 | Longsdorf et al. ............ 73/649 | |
| 2005/0099010 A1 | 5/2005 | Hirsch ............ 290/422 | |
| 2005/0109112 A1 | 5/2005 | Gysling et al. | |
| 2005/0115601 A1 | 6/2005 | Olsen et al. ............ 136/212 | |
| 2005/0118468 A1 | 6/2005 | Adams et al. ............ 429/22 | |
| 2005/0122653 A1 | 6/2005 | McCluskey et al. ............ 361/92 | |
| 2005/0130605 A1 | 6/2005 | Karschnia et al. ............ 455/90.3 | |
| 2005/0132808 A1 | 6/2005 | Brown et al. ............ 73/592 | |
| 2005/0134148 A1 | 6/2005 | Buhler et al. ............ 310/339 | |
| 2005/0164684 A1 | 7/2005 | Chen et al. ............ 455/414.1 | |
| 2005/0182501 A1 | 8/2005 | Franchuk et al. | |
| 2005/0201349 A1 | 9/2005 | Budampati ............ 370/342 | |
| 2005/0208908 A1 | 9/2005 | Karschnia et al. ............ 455/127.1 | |
| 2005/0222698 A1 | 10/2005 | Eryurek et al. ............ 700/90 | |
| 2005/0276233 A1 | 12/2005 | Shepard et al. ............ 370/254 | |
| 2005/0281215 A1 | 12/2005 | Budampati ............ 370/328 | |
| 2005/0289276 A1 | 12/2005 | Karschnia et al. ............ 710/305 | |
| 2006/0002368 A1 | 1/2006 | Budampati et al. ............ 370/351 | |
| 2006/0022555 A1 | 2/2006 | Balasubramaniam et al. ............ 310/339 | |
| 2006/0036404 A1 | 2/2006 | Wiklund et al. ............ 702/183 | |
| 2006/0063522 A1 | 3/2006 | McFarland ............ 455/423 | |
| 2006/0092039 A1 | 5/2006 | Saito et al. ............ 340/825.37 | |
| 2006/0128689 A1 | 6/2006 | Gomtsyan et al. ............ 514/217.01 | |
| 2006/0148410 A1 | 7/2006 | Nelson et al. ............ 455/67.11 | |
| 2006/0181406 A1 | 8/2006 | Petite et al. ............ 340/521 | |
| 2006/0227729 A1 | 10/2006 | Budampati et al. ............ 370/278 | |
| 2006/0274644 A1 | 12/2006 | Budampati et al. ............ 370/216 | |
| 2006/0274671 A1 | 12/2006 | Budampati et al. ............ 370/254 | |
| 2006/0277000 A1 | 12/2006 | Wehrs ............ 702/183 | |
| 2006/0287001 A1 | 12/2006 | Budampati et al. ............ 455/552.1 | |
| 2007/0006528 A1 | 1/2007 | Diebold et al. ............ 48/197 R | |
| 2007/0030816 A1 | 2/2007 | Kolavennu ............ 370/252 | |
| 2007/0030832 A1 | 2/2007 | Gonia et al. ............ 370/338 | |
| 2007/0039371 A1 | 2/2007 | Omata et al. ............ 73/9 | |
| 2007/0043480 A1 | 3/2007 | Stein ............ 340/601 | |
| 2007/0046480 A1 | 3/2007 | Stein | |
| 2007/0054630 A1 | 3/2007 | Scheible et al. ............ 455/90.3 | |
| 2007/0135867 A1 | 6/2007 | Klosterman et al. ............ 607/60 | |
| 2007/0188053 A1 | 8/2007 | Stark ............ 310/339 | |
| 2007/0228737 A1 | 10/2007 | Hirsch ............ 290/42 | |
| 2007/0229255 A1 | 10/2007 | Loechner ............ 340/540 | |
| 2007/0233283 A1 | 10/2007 | Chen ............ 700/17 | |
| 2007/0237137 A1 | 10/2007 | McLaughlin ............ 370/389 | |
| 2007/0273496 A1 | 11/2007 | Hedtke ............ 340/506 | |
| 2007/0275755 A1 | 11/2007 | Chae et al. ............ 455/557 | |
| 2008/0010600 A1 | 1/2008 | Katano ............ 715/748 | |
| 2008/0047355 A1* | 2/2008 | Chakrabartty et al. ............ 73/808 | |
| 2008/0054645 A1 | 3/2008 | Kulkarni et al. ............ 290/52 | |
| 2008/0083446 A1 | 4/2008 | Chakraborty et al. ............ 136/205 | |
| 2008/0088464 A1 | 4/2008 | Gutierrez ............ 340/606 | |
| 2008/0123581 A1 | 5/2008 | Wells et al. ............ 370/315 | |
| 2008/0141769 A1 | 6/2008 | Schmidt et al. ............ 73/204.19 | |
| 2009/0195222 A1 | 8/2009 | Lu ............ 22/3 | |
| 2009/0260438 A1 | 10/2009 | Hedtke ............ 73/579 | |

FOREIGN PATENT DOCUMENTS

| | | |
|---|---|---|
| CN | 1429354 A | 7/2003 |
| CN | 1442822 A | 9/2003 |
| DE | 3340034 A1 | 5/1985 |
| DE | 3340834 A1 | 5/1985 |
| DE | 35 03 597 C1 | 7/1986 |
| DE | 10104582 A1 | 10/2001 |
| EP | 0524550 A1 | 1/1993 |
| EP | 0 697 586 A2 | 2/1996 |
| EP | 1 202 145 | 5/2002 |
| EP | 1293853 A1 | 3/2003 |
| EP | 1 482 568 A2 | 12/2004 |
| EP | 1 519 190 A2 | 3/2005 |
| GB | 1 397 435 A | 6/1975 |
| GB | 2 145 876 A | 4/1985 |
| GB | 2 320 733 A | 7/1998 |
| JP | 59-075684 | 4/1984 |
| JP | 60-125181 | 7/1985 |
| JP | 02 067794 | 3/1990 |
| JP | 3-118424 | 5/1991 |
| JP | 4-14116 | 1/1992 |
| JP | 6-199284 | 7/1994 |
| JP | 7-244489 | 6/1995 |
| JP | 07-244489 | 9/1995 |
| JP | 8-247076 | 9/1996 |
| JP | 11-036981 | 2/1999 |
| JP | 11-215867 | 8/1999 |
| JP | 2003051894 | 2/2003 |
| JP | 2003134261 | 5/2003 |
| JP | 2004021877 | 1/2004 |
| JP | 2005-72080 | 3/2005 |
| JP | 2006248772 A | 9/2006 |
| RU | 2131934 C1 | 6/1999 |
| WO | WO 88/05964 | 8/1988 |
| WO | WO 91/11029 | 7/1991 |
| WO | WO 95/07522 | 3/1995 |
| WO | WO 99/53286 | 10/1999 |
| WO | WO 03/023536 | 3/2003 |
| WO | WO 03/089881 | 10/2003 |
| WO | WO 2004/059139 | 7/2004 |
| WO | WO 2004/082051 | 9/2004 |
| WO | WO 2004/094892 | 11/2004 |
| WO | WO 2005/060482 | 7/2005 |
| WO | WO 2005/086331 | 9/2005 |
| WO | WO2008098583 | 8/2008 |

OTHER PUBLICATIONS

Fourth Office Action from Chinese Patent Application No. 200580014212.4, dated Jul. 24, 2009.

(56) References Cited

OTHER PUBLICATIONS

Notification of Transmittal of the International Search Report and the Written Opinion of PCT/US2007/019636, dated Oct. 1, 2008.
Official letter regarding Mexican Patent Application No. PA/A/2006/013488, dated Jun. 25, 2009.
First Examination Report for Indian Patent Application No. 3589/CHENP/2006, dated Apr. 17, 2009.
Official Action from Russian Patent Application 2008116682, dated Jan. 16, 2009.
Second Office Action from Chinese Patent Application 200580006438.X, dated Apr. 10, 2009.
Third Office Action from Chinese Patent Application 200500014212.4, dated Dec. 19, 2008.
USA & Metric Thread Standards http://www.carrlane.com/cata-log/index.cfm/29425071FOB221118070C1C513906103E0B05543B0B0120090 83C3B285357474A2D020609090C0015312A36515F554A5B, downloaded Apr. 8, 2008.
"Wireless R&D Aims to Boost Traffic", by M. Moore, *InTech with Industrial Computing*, Feb. 2002, 3 pages.
"System Checks Faraway Machines' Health", by J. Strothman, *InTech with Industrial Computing*, Feb. 2002, 1 page.
"Wireless Management Toolkit XYR 5000", by Honeywell International Inc., Phoenix, Arizona, Oct. 2003, 3 pages.
"Wireless Analog Input Transmitters XYR 5000" by Honeywell International Inc., Phoenix, Arizona, Oct. 2003, 4 pgs.
"Quad Analog Output Module Installation and User's Manual", by Honeywell International Inc., Phoenix, Arizona, pp. II, III, IV and 1-12, Dec. 2003.
"Wireless Dual Analog Input Interface Transmitter Installation and User's Manual", by Honeywell International Inc., Phoenix, Arizona, pp. II-VI and 7-43, Dec. 2003.
"XYR 5000 Wireless Dual Analog Input Interface, Model Selection Guide", by Honeywell International Inc., Phoenix, Arizona, Dec. 2003.
"Wireless Measure, Monitor & Control", by Accutech, May 2003, 4 pages.
"Wireless Instrumentation, Multi-Input Field Unit", by Accutech, Dec. 2003, 2 pages.
"Quad Analog Output Module", by Accutech, Dec. 2003, 1 page.
3 Pages from Website www.chemicalprocessing.com, Apr. 2004.
4 Pages from Website http://content.honeywell.com/imc/eznews/eznews0403/news.htm, 2004.
Invitation to Pay Additional Fee and Partial Search Report for the PCT/US2007/011428, dated Oct. 8, 2008.
Chinese Office Action (with English translation) from Chinese Serial No. CN2010050700456580, dated May 12, 2010, 15 pages.
Office Action from Japanese Application No. 2011-506286, dated May 8, 2012.
Chinese Office Action (with English Translation) from Chinese Serial No. CN200980114167.8, dated Jun. 18, 2012.
Office Action from U.S. Pat. No. 8,250,924 B2, dated Sep. 21, 2011.
Notice of Allowance from U.S. Pat. No. 8,250,924 B2, dated Jun. 13, 2012.
Second Chinese Office Action (with English translation) for Chinese Application No. 200980114167.8, dated Dec. 12, 2012, 10 pages.
Second Japanese Office Action (with English translation) for Japanese Application No. 2011-506286, dated Nov. 27, 2012, 8 pages.
Notification of Transmittal of the International Search Report and the Written Opinion of the International Searching Authority for PCT/US2007/011428, dated Dec. 17, 2008.
Third Office Action from Chinese Patent Application No. 200580014212.4, dated Dec. 19, 2008.
Invitation to Pay Additional Fees and Partial Search Report, PCT/US2007/019396, dated Oct. 7, 2008.
Office Action of related U.S. Appl. No. 11/645,821, dated Apr. 13, 2010.
First Examination Report for Indian Patent Application No. 1782/DELNP/2008, dated May 1, 2014, 1 page.
Examination Report for European Patent Application No. 09734286.9, dated May 13, 2014, 7 pages.
"Notification of Transmittal of the International Search Report and the Written Opinion of the International Searching Authority, or the Declaration" for PCT/US2009/002476, dated Jul. 28, 2009.
First Office Action for related Chinese Application No. 200780018710.5, dated May 12, 2010; 18 pages.
High Power Single PSE Controller with Internal Switch, *Linear Technology LTC4263-1*, dated 2007, pp. 1-20.
First Office Action from Chinese Patent Application No. 200580006438.X, dated Jun. 13, 2008.
Examiner's consultation for European Patent Application 05 724 190.3, dated Jun. 30, 2008.
Decision on Refusal to Grant for Russian Patent Application No. 2006145434, dated Sep. 17, 2010.
First Office Action for Chinese Patent Application 200680015575.4, dated Oct. 31, 2008.
Notification of the Results of Examining the Invention for Patentability from Russian patent Application No. 2006145434, dated Jan. 8, 2008.
Second Office Action from Chinese Patent Application No. 200580014212.4, dated Sep. 19, 2008.
Examiner's Consultation from European Patent Application No. 05724190.3, dated Jun. 30, 2008.
First Office Action from Chinese Patent Application No. 2005800142124, dated Mar. 14, 2008.
Office Action from Chinese Patent Application No. 200500142125, dated Mar. 14, 2008.
Official Communication from Application No. 05746241.8, dated Aug. 29, 2007.
Notification of Translation of International Search Report and Written Opinion in PCT/US2007/011428, dated Dec. 17, 2009.
"Invitation to Pay Additional Fees" PCT/US2004/031678, dated Jan. 19, 2005.
"Notification of Transmittal of the International Search Report and the Written Opinion" PCT/US2004/022736, dated Mar. 7, 2005.
"Notification of Transmittal of the International Search Report" PCT/US00/14798, dated Oct. 4, 2000.
The Official Communication in Application No. 05746241.8, dated Aug. 27, 2009.
The International Search Report and Written Opinion in Application No. PCT/US2006/035728, dated Jan. 12, 2007.
International Search Report and Written opinion of Application No. PCT/US2005/015848, dated Aug. 10, 2005.
Second Official Action from Russian Patent Application No. 2006145434, dated Mar. 28, 2008.
Examination Report of the European Patent Office in Application No. 05724190.3, dated Aug. 1, 2007.
The International Search Report and Written Opinion in Application No. PCT/US2005/021757, dated Feb. 13, 2006.
The Official Communication in Russian Patent Application No. 2006145434, dated Oct. 2, 2008.
Notification of Transmittal of the International Search Report or the Declaration—PCT/US03/10403, dated Aug. 13, 2003.
Notification of Transmittal of the International Search Report and the Written Opinion of the International Searching Authority, or the Declaration for PCT/US2009/062152, dated Jun. 2, 2010.
Official Communication from Indian Patent Application No. 2150/MUMNP/2010, dated Jul. 28, 2015.

\* cited by examiner

INDUSTRIAL PROCESS DEVICE UTILIZING PIEZOELECTRIC TRANSDUCER

CROSS-REFERENCE TO RELATED APPLICATION

The present application is a Divisional of and claims priority of U.S. patent application Ser. No. 12/107,225, filed Apr. 22, 2008, the content of which is hereby incorporated by reference in its entirety.

BACKGROUND OF THE INVENTION

The present invention relates to industrial process devices of the type used to couple to industrial process control and monitoring systems.

In industrial settings, control systems are used to monitor and control inventories of industrial and chemical processes, and the like. Typically, a control system performs these functions using field devices distributed at key locations in the industrial process and coupled to the control circuitry located in a control room by a process control loop. The term "field device" refers to any device that performs a function in a distributed control or process monitoring system, including all devices used in the measurement, control and monitoring of industrial processes.

Some field devices include a process variable sensor. Typically, the transducer transforms an input into an output having a different form. Types of transducers include various analytical equipment, pressure sensors, thermistors, thermocouples, strain gauges, flow transmitters, positioners, actuators, solenoids, indicator lights, and others. Other field devices include a control element and are used to control the industrial process. Examples of such process devices include valve controllers, valve position controllers, heater controllers, pump controllers, etc.

In many process installations, process devices experience pulsations. The pulsations can occur during normal operation of the process.

SUMMARY

A process device for coupling to an industrial process for use in monitoring or controlling the process includes a device housing configured to physically couple to the industrial process. A process variable sensor is configured to measure a process variable and measurement circuitry coupled to the process variable sensor provides an output related to the sensed process variable. A piezoelectric transducer provides an electrical output related to pressure pulsations in the industrial process. Electrical circuitry in the housing includes an input configured to receive the electrical output from the piezoelectric sensor. In one configuration, the electrical output provides power to the process device.

DETAILED DESCRIPTION

Various prior art techniques exist which utilize mechanical vibrations in processes for diagnostic or harvesting energy. However, these vibrations are typically received from process components such as piping, mounting brackets, etc rather than from directly receiving pulsations from the process fluid, for example, from process fluid carried in a process pipe. These pressure pulsations may arise from many sources including, for example, pumps, pipe obstructions, etc. In some instances, the internal pressure pulsations do not result in external mechanical vibrations which are transmitted into the piping itself, brackets, or other components. Often, the maximum energy available is inside the process vessel, for example inside the process piping. In one aspect, the present invention includes capturing this energy from the process and using it for diagnostics and/or energy harvesting. As used herein, a "pressure pulsation" is any type of a change in pressure in the process fluid. Pressure pulsations may be carried in the form of waves of pressure, a traveling wavefront, etc. In one configuration, the pressure pulsations may comprise a single pressure pulse and in other configurations, the pressure pulsation can be a periodic or repeating wave form, or other wave form having an extended duration.

Figure 1:
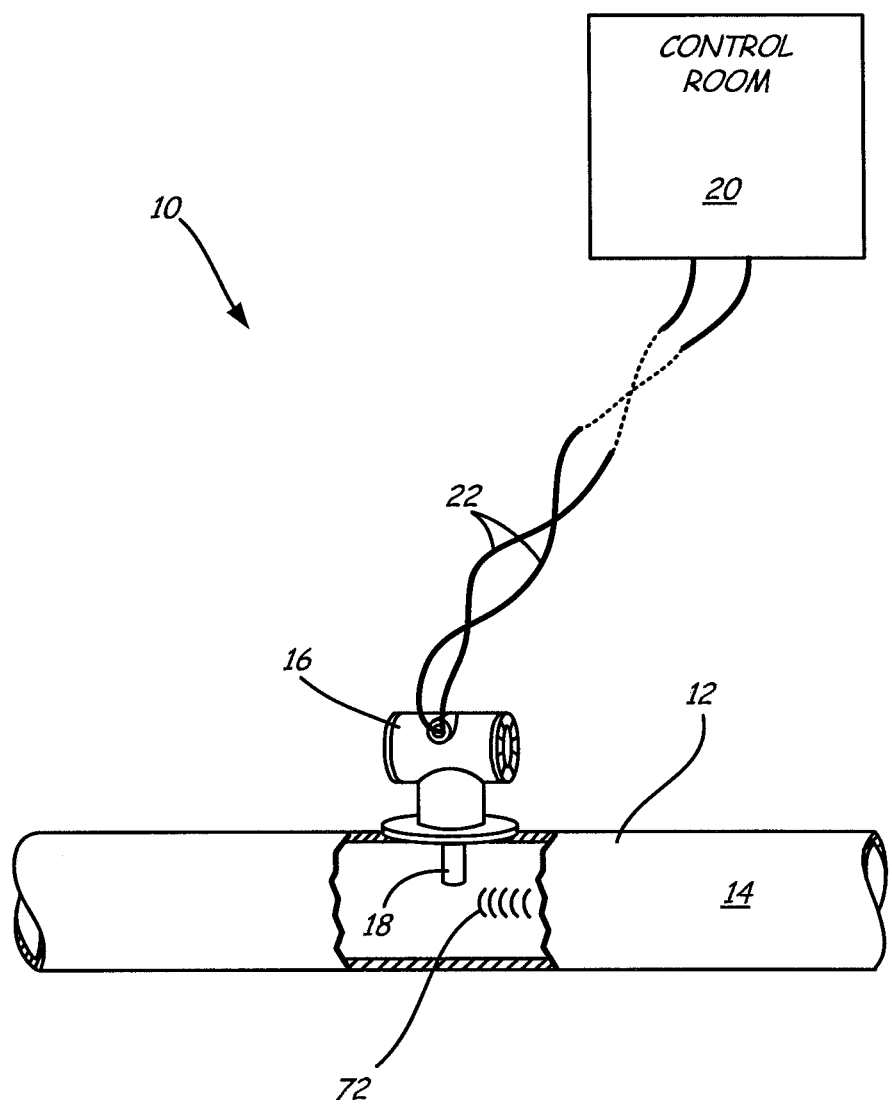
FIG. 1 is a simplified diagram of a process monitoring or control system for monitoring or controlling an industrial process.

FIG. 1 is a simplified diagram of an industrial process controller monitoring system 10 including a process device 16 in accordance with the present invention. As discussed in more detail below, process device 10 includes a piezoelectric transducer (not shown in FIG. 1) configured to move in response to pressure pulsations in system 10 and thereby generate an electrical output.

Process device 16 is shown coupled to process piping 12 which is configured to carry a process fluid 14. A process interface element 18 is configured to couple to the process and is used for input or output to the process device 16. For example, if the process device is configured as a process control transmitter, interface element 18 can comprise some type of a process variable sensor such as a pressure sensor, flow sensor, temperature sensor, etc configured to sense a process variable. On the other hand, if process device 16 is configured as a process control device, interface element 18 can be, for example, a valve, a heater, a motor, a pump, etc., which is used to control the process. Process device 16 couples to remotely located circuitry such as control room 20 over a process control loop 22. Process control loop 22 is illustrated as a two wire process control loop and can comprise, for example, a process control loop configured to operate in accordance with industrial standards. Example industrial standards include 4-20 mA protocols, the HART® protocol, FieldBus protocols, and others. In some embodiments, device 16 communicates using a wireless process control loop and may or may not also couple to wired loop 22. FIG. 1 also shows a pressure pulse 72 carried in the process fluid.

Figure 2:
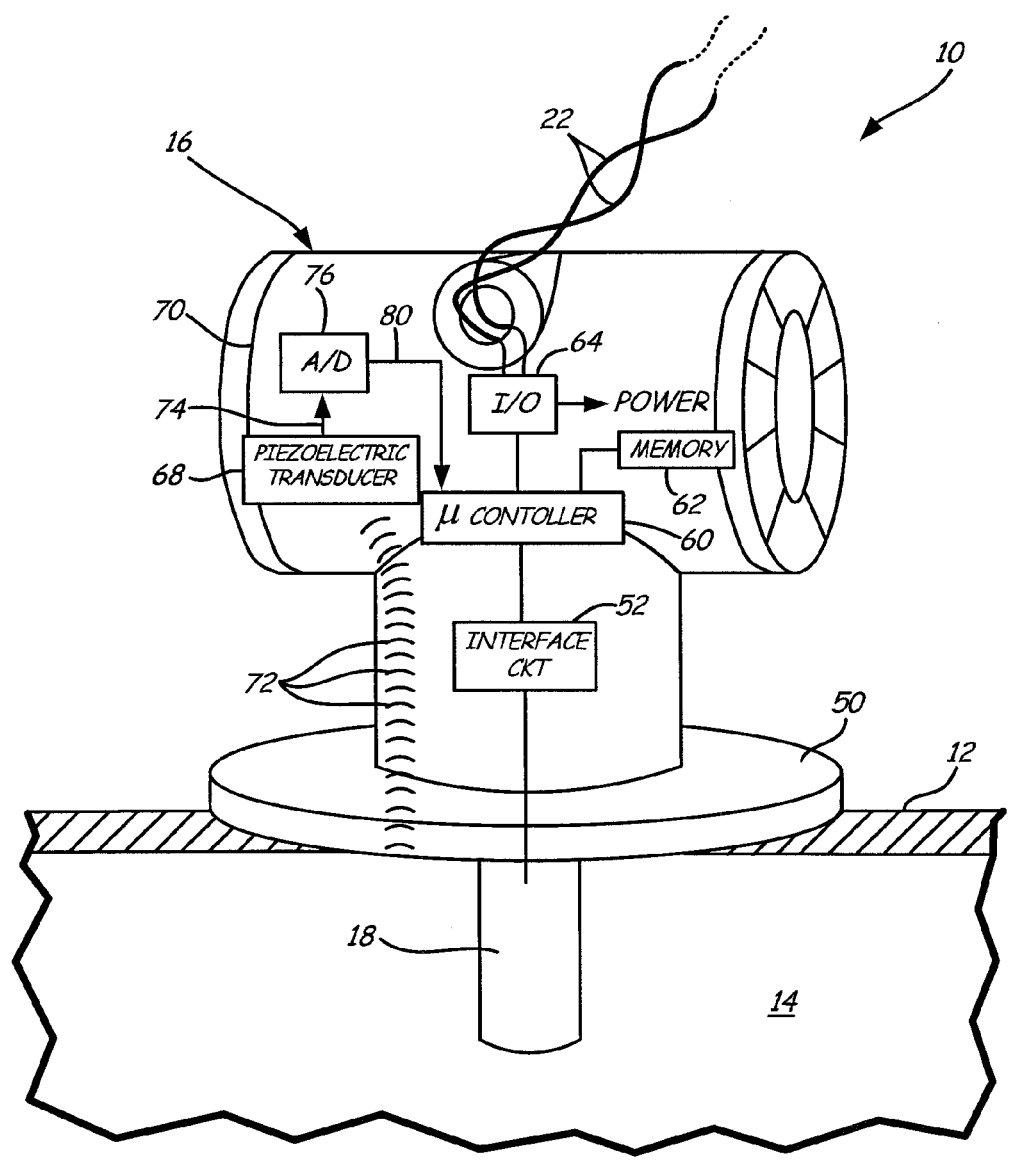
FIG. 2 shows a cutaway view and simplified block diagram of a process device including pulsation sensing circuitry for use in performing diagnostics.

FIG. 2 is a simplified cross-sectional view showing one example embodiment of the present invention in which process device 16 couples to process piping through a process coupling 50 such as a flange or the like. Field device 16 includes interface circuitry 52 which couples to process interface 18. When configured as a transmitter, interface circuitry 52 can perform initial processing and operate with a process variable sensor. Similarly, when configured as a process controller, interface circuitry 52 is used to control the process interface 18. Field device 16 includes a microcontroller 60 which operates in accordance with programming instructions stored in memory 62. Microcontroller 60 also couples to I/O circuitry 64 which itself couples to process control loop 22. In some configurations, I/O circuitry 64 also provides a power output which is used to power some or all of the circuitry of process device 16.

Piezoelectric transducer 68 is mounted in a device housing 70 of the process device 16. Piezoelectric transducer 68 is physically coupled to the process, either directly or indirectly through one or more additional components, such that pressure pulsations 72 emanating from the industrial process 14 are received by piezoelectric transducer 68. These pulsations cause movement of transducer 68 which results in an electrical output signal 74 which is a function of the received pulsations. In the configuration of FIG. 2, piezoelectric transducer 68 provides an electrical output signal 74 to an analog to digital converter 76. The analog to digital converter 76 receives the output signal 74 and provides a digitized signal 80 to the microcontroller 60. The microcontroller 60 can process the digitized signal using any desired technique and is not limited to those discussed herein.

In one example configuration, microcontroller 60 monitors the amplitude, spectral content and/or signature (time and/or frequency) of the pulsation signal 72. The signal 72 can be compared against known signals which are representative of nominal operation of the process 10. Nominal signal values such as amplitude, spectral content and/or signatures can be stored, for example, in memory 62.

In another example configuration, certain levels or thresholds in the output signal 74 may indicate specific failures in the process 10 such as a broken or failing pump or bracket. Similarly, certain frequencies or groups of frequencies may suggest specific failures such as a failing or failed impeller. The pulsation information can also be used to provide prognostic information related to the expected lifetime reduction in the process device 10, or other device in process 10, due to the exposure to pulsations. If, during operation of the process device 16, the pulsation signal 72 varies in a predetermined manner from the stored nominal values, programming instructions executed by microcontroller 60 can be used to make a determination that some type of event has occurred in the process which warrants further investigation. For example, the microcontroller 60 can provide an output signal indicative of component failure or potential failure that should be investigated by an operator. The information can also be used for other purposes such as to provide an indication of operation of other components in the industrial process such as a valve controller or the like. If the process coupling 50 has become loose, the pulsation signal 72 will also change. In another example, if the pulsation signal 72 should suddenly decrease or even disappear completely, this can be an indication that the process 10 has improperly shut down or is in an undesirable state. Various examples of diagnostic techniques are shown in U.S. Pat. No. 6,601,005, issued Jul. 29, 2003 by Eyrurek, which is incorporated herein by reference in its entirety.

Figure 3:
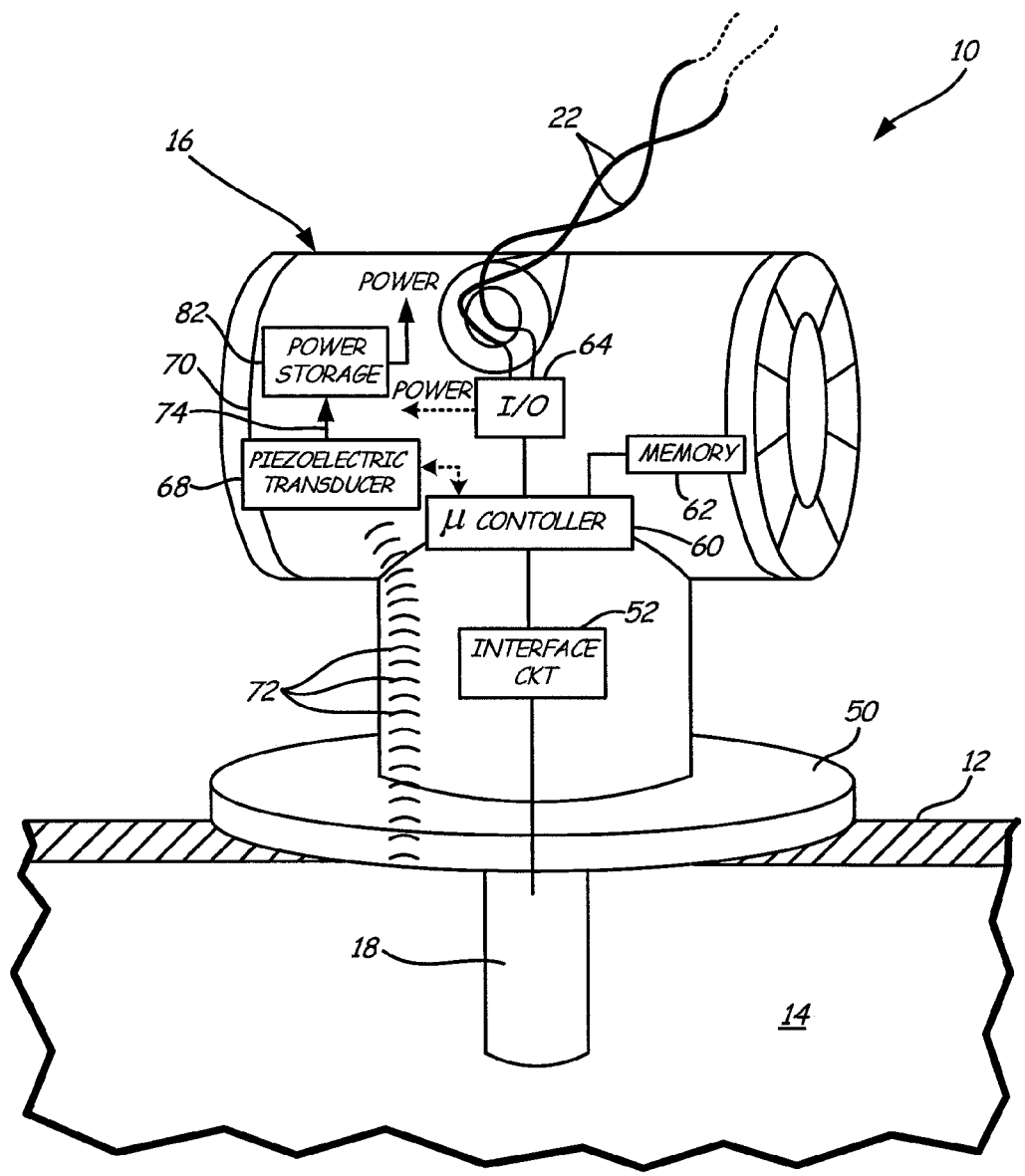
FIG. 3 shows a cutaway view and simplified block diagram of a process device including pulsation sensing circuitry for use in generating power for the process device.

FIG. 3 is another simplified block diagram of process device 16 showing another example configuration of the present invention. In FIG. 3, elements which are similar to those shown in FIG. 2 have retained their numbering. In the configuration of FIG. 3, the pulsation signal 72 is received by piezoelectric transducer 68. The current output signal 74 from piezoelectric transducer 68 is provided to a power storage circuitry 82. Power storage circuitry 82 can be any appropriate device for storing electrical power and can include, for example, an electrical capacitor and rectifying circuitry, a battery, etc., used to store energy from piezoelectric transducer 68. Power storage circuitry 82 provides a power output signal which can be used to power process device 16. In such a configuration, I/O circuitry 64 may not be required to provide a power output signal. Further, in some configurations process device 16 is configured to operate over a wireless connection and I/O circuitry 64 is used for wireless communication. Power storage circuitry 82 can provide all of the power for process device 16, or can provide supplemental or backup power to the device 16.

In general, power from the process cannot be harvested using this technique unless there is kinetic energy. For example, a pressurized vessel may contain a significant amount of potential energy. However, if the pressure remains constant, the energy cannot be harvested. One solution is to harvest energy created by process pressure noise such as due to a water "hammer" effect, pump pulsations, etc. With the present invention, such energy can be harvested using a piezoelectric effect. Typical piezoelectric elements have a relatively low current output. However, given a sufficient input force, enough power may be generated to be useful in process control devices. In various configurations, the piezoelectric transducer can be used to harvest power from pressure pulsations in the process fluid. The piezoelectric transducer can be integrated into a pressure sensor module or process connection to thereby eliminate external wiring. A battery capacitor or other power storage device, such as power storage 82 shown in FIG. 3, can be included in the configuration. The battery can wholly or partially supplement power provided by the piezoelectric transducer. Further, the piezoelectric transducer can be used, to charge the battery when there is sufficient excess energy. This can also extend the life of the battery by reducing discharge. In another example configuration, a control signal can be applied to the piezoelectric transducer 68 from microcontroller 60 to thereby cause movement of the transducer 68 and provide pressure pulsations. In such a configuration, the induced pressure signal can be sensed by a pressure sensor of the process device to diagnose or verify transmitter operation. The magnitude of the signal can also be used to provide an indication of line pressure. Although a single piezoelectric transducer 68 is illustrated, multiple circuits can be used.

Figure 4:
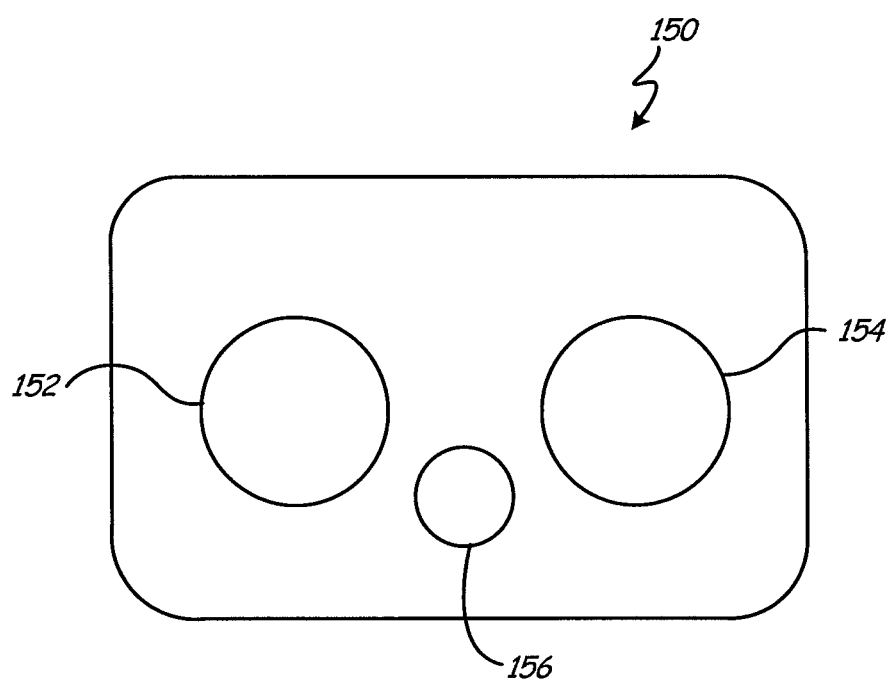
FIG. 4 is a bottom plan view of a sensor module including an isolation diaphragm for use with a piezoelectric transducer.

FIG. 4 shows a bottom plan view of a pressure module 150 for use in one embodiment of the present invention. The pressure module 150 includes an isolation diaphragm 152 for coupling to a high side of a process pressure and an isolation diaphragm 154 for coupling to a low pressure side of a process pressure. A pressure sensor, for example embodied in interface circuitry 52 shown in FIGS. 2 and 3, can be used and arranged to measure a differential pressure between diaphragms 152 and 154 applied by process fluid. Such differential pressure can be indicative, for example, of flow rate of the process fluid. A isolation diaphragm 156 can be used to couple the piezoelectric transducer 68 to the process fluid. For example, the piezoelectric transducer 68 can mount to the isolation diaphragm 156 such that movement of the isolation diaphragm 156 causes movement of the piezoelectric transducer 68. This allows transducer 68 to directly sense pulsations in the process fluid.

Figure 5:
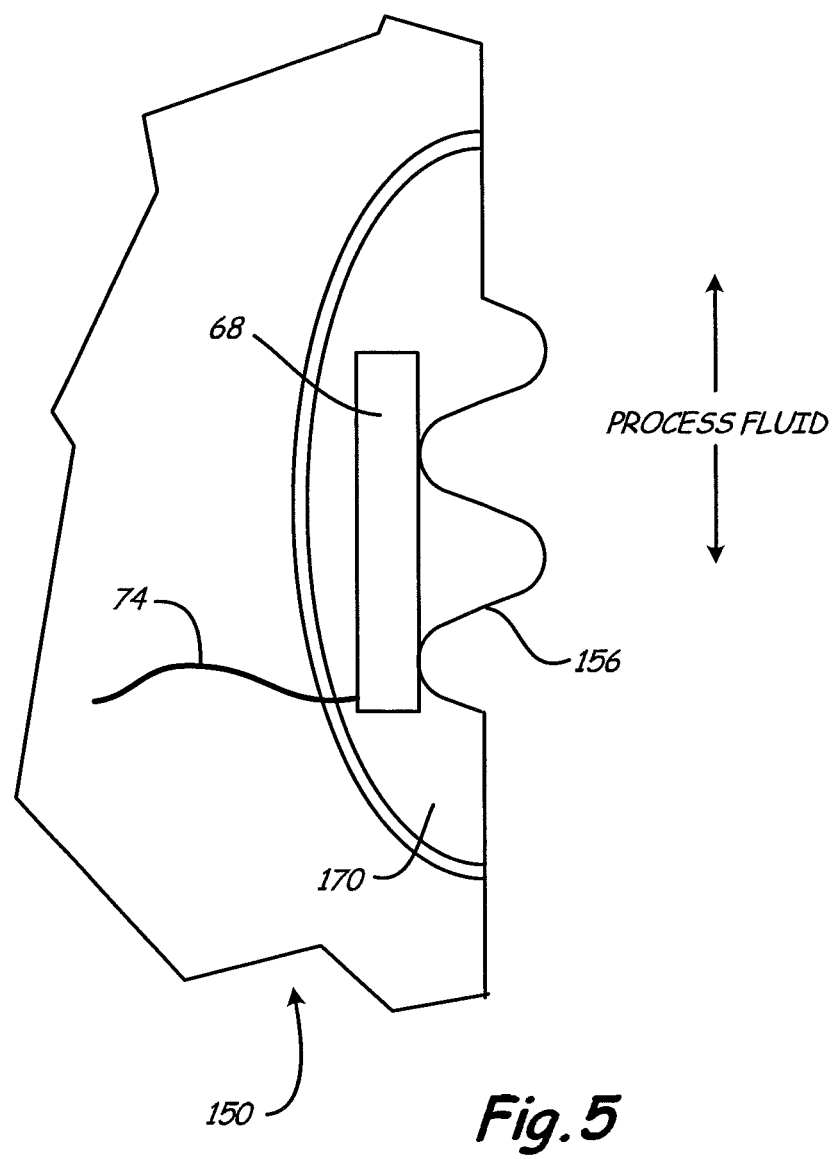
FIG. 5 is cross sectional view showing an isolation diaphragm for use with a piezoelectric transducer.

FIG. 5 is a side cross sectional view of module 150 showing diaphragm 156 in greater detail. As illustrated in FIG. 5, the piezoelectric sensor 68 is physically coupled to diaphragm 156. The sensor 68 is shown positioned in a cavity 170 formed in module 150. An electrical connection carries the output 74 from transducer 68. In the configuration of FIG. 5, as pulsations occur in the process fluid, diaphragm 156 will move. This movement of diaphragm 156 causes a resultant movement of transducer 68 which results in an electrical output. As discussed above, an input signal can be applied to transducer 68 resulting in movement of diaphragm 156 which induces a pulsation in the process fluid.

Figure 6:
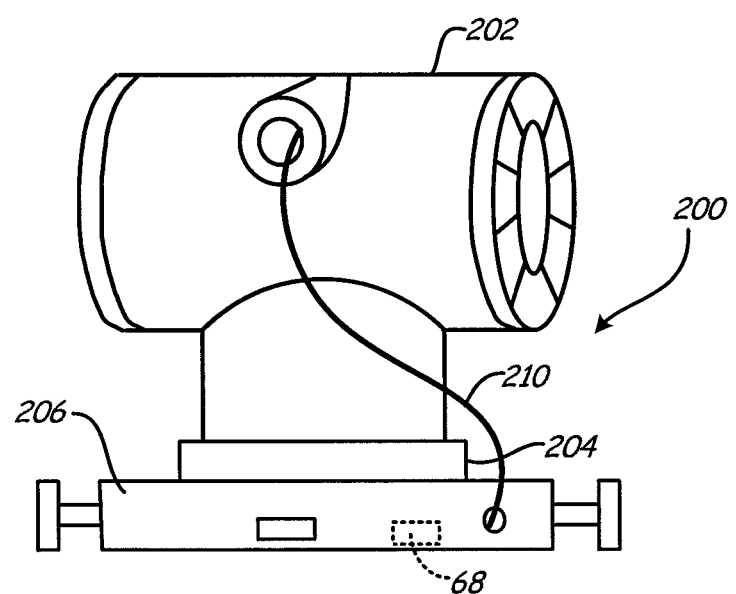
FIG. 6 is a planned view of a process device including a piezoelectric transducer located in a mounting flange.

FIG. 6 is a plan view of another example embodiment of the present invention in which the process variable transmitter is shown which includes a transmitter electronics housing 202 and a sensor module 204. A mounting flange 206 is used to mount the transmitter sensor module 204 to piping of an industrial process. The flange 206 may, for example, include valves or the like. In the configuration of FIG. 5, the piezoelectric transducer 68 is carried in the flange 206 and can be, for example, coupled to the process fluid using a technique such as that illustrated in FIG. 5 which uses the diaphragm 156. An electrical connection 210 extends from flange 206 to the transmitter electronic housing 202 is used to couple electrical signals and/or from the transducer 68.

Figure 7:
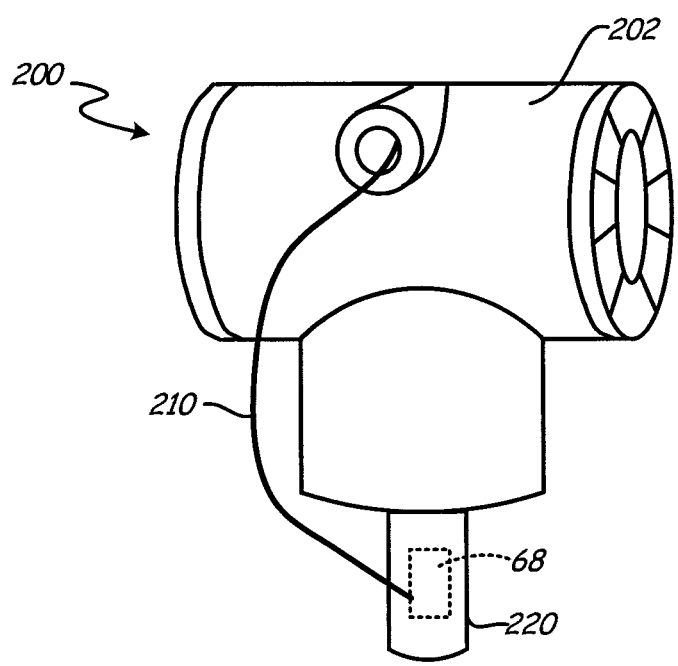
FIG. 7 is a planned view of a process device including a piezoelectric transducer located in a process coupling.

FIG. 7 is a plan view of transmitter 200 configured in a similar manner to that which is shown in FIG. 6 and the numbering has been retained accordingly. However, in the configuration of FIG. 7, the transmitter 200 includes some type of a process coupling 220 such as a probe for sensing temperature, pressure, etc. The coupling in the configuration of FIG. 7, the coupling 220 is illustrated as including the piezoelectric transducer 68. The transducer 68 can be coupled to the process using any appropriate technique, including, for example, the diaphragm 156 shown in FIG. 5.

In the configurations of FIGS. 6 and 7, the piezoelectric transducer is carried in a "wetted" component. Such configurations may be advantageous because they can be repaired or upgraded in the field without altering the transmitter itself. Further, these configurations do not require additional space within the transmitter housing.

Figure 8:
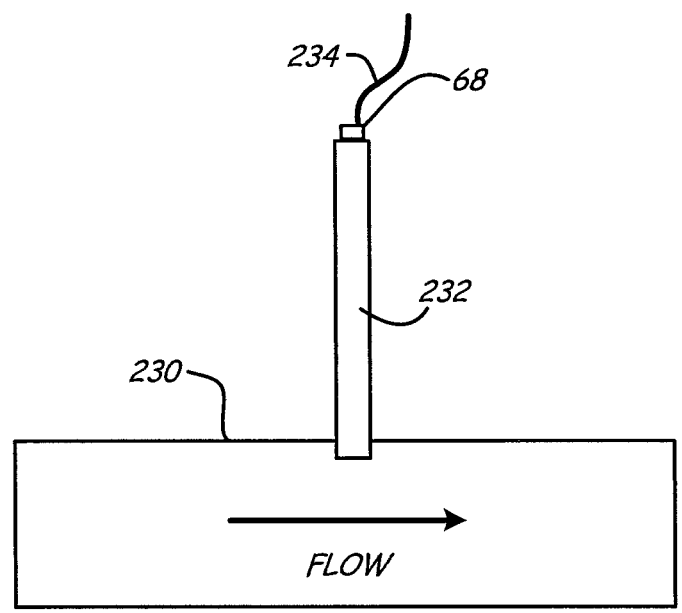
FIG. 8 is a simplified diagram of a configuration in which a piezoelectric transducer is coupled to the process fluid at a location remote from the process device.

FIG. 8 shows another example configuration of the present invention in which the piezoelectric sensor 68 is coupled to process piping 230 through a resonant pipe 232. The transducer 68 couples to a process device, such as those discussed above through electrical connection 234. In the configuration of FIG. 8, the piezoelectric transducer is separated from the process device. The transducer 68 may include electronics to provide amplification or signal processing and can be configured to screw, for example into a threaded port on a vessel. In one configuration, the transducer 68, including its associate electronics, is between 1 to 2 inches in diameter and 1 to 2 inches in height and appear as a pipe plug. Such a configuration is advantageous because it may be repaired or upgraded in the field and increases energy harvesting as the process measurement point may be different from the optimum process noise location. The optional resonant in pipe 262 may be configured to take advantage of standing waves that can occur in any closed wave medium. For example, this configuration can be used to amplify or otherwise focus pulsations in the process fluid onto the piezoelectric transducer 68. In the example of a resonated pipe, the equation is $L=Vs/F$ where L is the length of the pipe, Vs is the speed of sound and F is the frequency of the sound. In one configuration, pulsation frequencies of interest will generally be in the range of 60 to 80 hertz and the length of resonant pipe 232 may be between 0.5 and one meter.

Although other configurations may be used, in one embodiment, the circuitry may include a super capacitor to store electrical charge from the piezoelectric transducer. When the energy being scavenged is sufficient to power the device, the scavenged energy can be used rather than energy from a battery. Further, when scavenged energy is still greater, excess charge can be stored in, for example, a super capacitor. However, if the energy generated by the transducer 68 is not sufficient to power the device, energy from a battery may be used. Thus, in such a configuration, the energy scavenging does not replace the battery in the device, but rather extends battery life.

Although the present invention has been described with reference to preferred embodiments, workers skilled in the art will recognize that changes may be made in form and detail without departing from the spirit and scope of the invention. Although the embodiments of FIGS. 2 and 3 are illustrated separately, the piezoelectric transducer 68 can be used simultaneously for both diagnostics as well as power generation.

What is claimed is:

1. A process device for coupling to an industrial process for use in monitoring or controlling the process, comprising:
 a device housing configured to physically couple to the industrial process;
 a process variable sensor configured to measure a process variable;
 measurement circuitry coupled to the process variable sensor having an output related to the sensed process variable;
 a piezoelectric sensor having an electrical output related to pressure pulsations in the industrial process;
 electrical circuitry in the housing having an input configured to receive the electrical output from the piezoelectric sensor;
 a memory which stores nominal signal values comprising known signals from the piezoelectric sensor representative of pressure pulsations during nominal operation of the process arising due to operation of a component in the industrial process; and
 output circuitry configured to provide an output related to the process variable sensed by the process variable sensor;
 wherein the electrical circuitry is configured to diagnose operation of the industrial process based upon the electrical output from the piezoelectric sensor by comparing the electrical output from the piezoelectric sensor with nominal signal values stored in the memory and responsively providing an output indicative of a life expectancy of the component in the industrial process.

2. The apparatus of claim 1 wherein the process device is powered with the electrical output.

3. The apparatus of claim 1 including an analog to digital converter having a digital output related to the electrical output.

4. The apparatus of claim 1 including a microcontroller configured to perform diagnostics based upon the electrical output from the piezoelectric sensor.

5. The apparatus of claim 1 wherein the nominal signal values stored in the memory comprise amplitude values.

6. The apparatus of claim 1 wherein the nominal signal values stored in the memory comprise frequency values.

7. The apparatus of claim 1 wherein the nominal signal values stored in the memory comprise a signature.

8. The apparatus of claim 1 wherein the piezoelectric sensor is configured to receive a control signal which causes movement of the piezoelectric sensor.

9. The apparatus of claim 8 wherein movement of the piezoelectric sensor induces pressure pulsations in the process fluid which are sensed by the process variable sensor, the electrical circuitry further configured to diagnose process device operation based upon the sensed pressure pulsations.

10. The apparatus of claim 1 wherein the electrical circuitry includes power storage circuitry configured to store power from the piezoelectric sensor.

11. The apparatus of claim 10 wherein the power storage circuitry comprises a capacitor.

12. The apparatus of claim 11 wherein the capacitor comprises a supercapacitor.

13. The apparatus of claim 1 wherein the piezoelectric sensor is mounted in the housing of the process device.

14. The apparatus of claim 1 wherein the piezoelectric sensor is mounted in a sensor module of the process device.

15. The apparatus of claim 1 wherein the piezoelectric sensor is carried on a mounting flange used to couple the process device to the industrial process.

16. The apparatus of claim 1 wherein the piezoelectric sensor is positioned at a location which is spaced apart from the device housing.

17. The apparatus of claim 1 wherein the piezoelectric sensor couples to the process fluid through a resonant pipe.

18. The apparatus of claim 1 wherein the piezoelectric sensor couples to process fluid through a diaphragm.

19. A method for sensing pulsations in a process device coupled to an industrial process of the type used in monitoring a process variable of industrial process, the method comprising:
    physically coupling a piezoelectric sensor to the industrial process;
    receiving pressure pulsations from the industrial process through the physical coupling;
    sensing a process variable with a process variable sensor;
    providing a process variable output based upon the sensed process variable;
    coupling the pressure pulsations to the piezoelectric sensor and providing an electrical output from the piezoelectric sensor in response to the pressure pulsations;
    storing nominal signal values in a memory, the nominal signal values comprising comprising known signals from the piezoelectric sensor representative of pressure pulsations during nominal operation of the process arising due to operation of a component in the industrial process;
    providing the electrical output to circuitry of the process device; and
    providing an output related to the sensed process variable;
    diagnosing operation of the industrial process based upon the electrical output by comparing the electrical output from the piezoelectric sensor with nominal signal values stored in the memory and responsively providing an output indicative of a life expectancy of the component in the industrial process.

20. The method of claim 19 including powering the electrical circuitry with the electrical output.

21. The method of claim 19 including digitizing the electrical output.

22. The method of claim 19 wherein the nominal signal values stored in the memory comprise amplitude values.

23. The method of claim 19 wherein the nominal signal values stored in the memory comprise frequency values.

24. The method of claim 19 wherein the nominal signal values stored in the memory comprise a signature.

25. The method of claim 19 including providing a control signal to the piezoelectric sensor which causes movement of the piezoelectric sensor.

26. The method of claim 25 wherein the movement of the piezoelectric sensor induces pressure pulsations in the process fluid and sensing the pressure pulsations with the process variable sensor, the method further including diagnosing process device operation based upon the sensed pressure pulsations.

27. The method of claim 19 wherein the piezoelectric sensor is mounted in the housing of the process device.

28. The method of claim 19 wherein the piezoelectric sensor is mounted in a sensor module of the process device.

29. The method of claim 19 wherein the piezoelectric sensor is carried on a mounting flange used to couple the process device to the industrial process.

30. The method of claim 19 wherein the piezoelectric sensor is positioned at a location which is spaced apart from the device housing.

31. The method of claim 19 wherein the piezoelectric sensor couples to process fluid through a resonant pipe.

32. The method of claim 19 wherein the piezoelectric sensor couples to process fluid through a diaphragm.

* * * * *